United States Patent
Wald et al.

(10) Patent No.: US 7,091,328 B2
(45) Date of Patent: Aug. 15, 2006

(54) FIBER-REACTIVE MONO-AZO DYES

(75) Inventors: Roland Wald, Huningue (FR); Markus Gisler, Rheinfelden (CH)

(73) Assignee: Clariant Finance (BVI) Limited, Tortola (VG)

( * ) Notice: Subject to any disclaimer, the term of this patent is extended or adjusted under 35 U.S.C. 154(b) by 239 days.

(21) Appl. No.: 10/475,624

(22) PCT Filed: Apr. 15, 2002

(86) PCT No.: PCT/IB02/01274

§ 371 (c)(1),
(2), (4) Date: Oct. 20, 2003

(87) PCT Pub. No.: WO02/085986

PCT Pub. Date: Oct. 31, 2002

(65) Prior Publication Data
US 2004/0127693 A1 Jul. 1, 2004

(30) Foreign Application Priority Data
Apr. 20, 2001 (GB) ................... 0109727.8
Sep. 21, 2001 (GB) ................... 0122699.2

(51) Int. Cl.
*C09B 62/51* (2006.01)
*C09B 67/22* (2006.01)
*C09D 11/02* (2006.01)
*D06P 1/384* (2006.01)

(52) U.S. Cl. .................. 534/638; 8/549
(58) Field of Classification Search ........ 534/638; 8/549
See application file for complete search history.

(56) References Cited

U.S. PATENT DOCUMENTS

| | | | | |
|---|---|---|---|---|
| 5,292,870 A * | 3/1994 | Anderton | ........ | 534/638 |
| 5,304,221 A | 4/1994 | Schwarz et al. | ........ | 8/549 |
| 5,399,182 A | 3/1995 | Schwarz et al. | ........ | 8/639 |
| 5,428,141 A | 6/1995 | Herd et al. | ........ | 534/638 |
| 5,665,124 A | 9/1997 | Jager et al. | ........ | 8/526 |
| 6,090,164 A | 7/2000 | Steckelberg et al. | ........ | 8/549 |
| 6,136,045 A | 10/2000 | Pedemonte et al. | ........ | 8/549 |
| 6,372,893 B1 * | 4/2002 | Nusser | ........ | 534/634 |

FOREIGN PATENT DOCUMENTS

| | | |
|---|---|---|
| CA | 1 221 360 | 5/1987 |
| EP | 0 094 055 | 11/1983 |
| EP | 0 318 968 | 6/1989 |
| EP | 0 486 176 | 5/1992 |
| EP | 0 545 219 | 6/1993 |
| EP | 0 709 436 | 5/1996 |
| EP | 0 719 841 | 7/1996 |
| EP | 0 957 137 | 11/1999 |
| EP | 0 979 849 | 2/2000 |
| EP | 1 046 678 | 10/2000 |
| JP | 7-216253 | 8/1995 |

OTHER PUBLICATIONS

English abstract for JP 7-216253, Aug. 15, 1995.
English abstract for DP 0719841, Jul. 3, 1996.
International Search Report for application No. PCT/IB 02/01274, mail dated Sep. 6, 2002.
International Preliminary Examination Report for application No. PCT/IB 02/01274, mail dated Aug. 27, 2003.

* cited by examiner

*Primary Examiner*—Fiona T. Powers
(74) *Attorney, Agent, or Firm*—Tod A. Waldrop

(57) ABSTRACT

According to the invention there are provided fiber-reactive dyestuffs which are compounds of the formula (I)

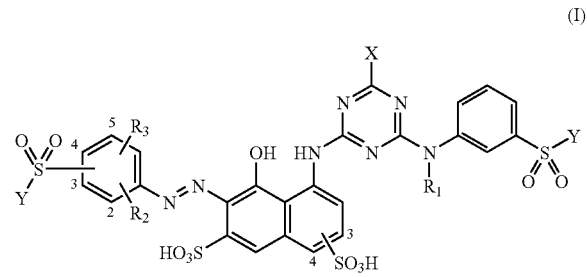

wherein the substituents are defined as in claim 1,
a process making the same and their use in dyeing or printing hydroxy-group-containing organic substrates.

16 Claims, No Drawings

FIBER-REACTIVE MONO-AZO DYES

This invention relates to fiber-reactive dyestuffs, a process of making the same and to their use in dyeing or printing hydroxy-group-containing or nitrogen-containing organic substrates.

According to the invention there are provided fiber-reactive dyestuffs which are compounds of the formula (I)

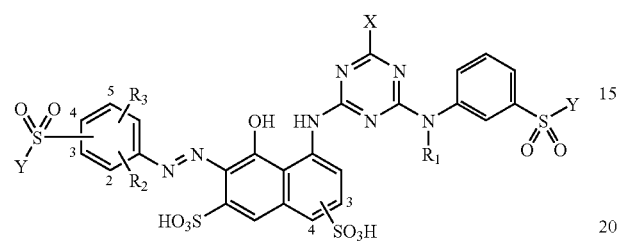

(I)

wherein
$R_1$ is a $C_{1-4}$-alkyl group or a substituted $C_{2-4}$-alkyl group,
$R_2$ and $R_3$ are independently from each other H; —OH; —CN; $C_{1-2}$-alkyl; —SO$_3$H; —COOH; —OC$_{1-2}$-alkyl or —NH$_2$,
X is a halogen radical and
Y signifies —CH=CH$_2$ or —CH$_2$CH$_2$-Z, wherein Z is a radical which can be eliminated by alkali,
or a salt thereof and/or mixtures thereof, with the provisos that
(i) the compounds of the following formula

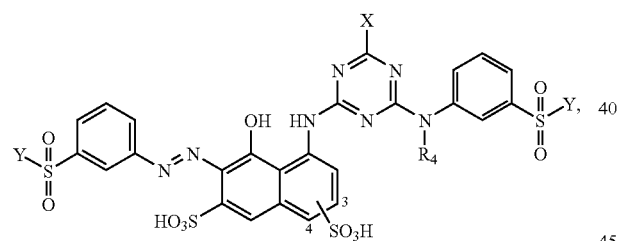

wherein X and Y have the same meanings as defined above and $R_4$ signifies methyl or ethyl, are excluded from the scope of the protection and
(ii) mixtures with at least one compound of formula (I) wherein X is Cl and at least one compound of formula (I) wherein X is F are excluded from the scope of the protection as well.

In the compound of formula (I) the alkyl groups can be linear or branched. Preferably, X is Cl or F. Preferably, Z is a —OSO$_3$H group.

Preferably, in the compound of formula (I) $R_1$ is a $C_{1-4}$-alkyl group, more preferably a $C_{1-2}$-alkyl-group, most preferably a —C$_2$H$_5$ group or $R_1$ is a $C_{2-4}$-alkyl group, which is monosubstituted by Cl, F, Br, —OH, —CN or —NH$_2$.

Preferably, in the compound of formula (I) $R_2$ and $R_3$ are independently from each other H; $C_{1-2}$-alkyl; —SO$_3$H or —OC$_{1-2}$-alkyl, more preferably $R_2$ and $R_3$ are H.

Preferably, in the compound of formula (I) the Y-group is attached to the phenylring at position 3, 4 or 5, more preferably at position 4.

Preferred compounds according to formula (I) have the following formula (Ia)

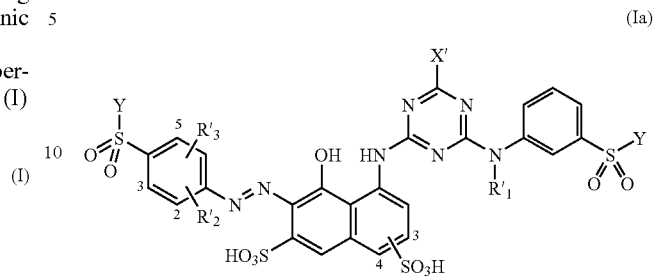

(Ia)

wherein
X' is Cl or F,
$R'_1$ is a $C_{1-2}$-alkyl, especially —C$_2$H$_5$, or a $C_{2-4}$-alkyl group, which is monosubstituted by Cl, F, Br, —OH, —CN or —NH$_2$,
$R'_2$ and $R'_3$ are independently from each other H; $C_{1-2}$-alkyl; —SO$_3$H or —OC$_{1-2}$alkyl, especially H; —CH$_3$; —SO$_3$H or —OCH$_3$, and
Y signifies —CH=CH$_2$ or —CH$_2$CH$_2$-Z, wherein Z is a radical which can be eliminated by alkali,
or a salt thereof and/or mixtures thereof, with the proviso that
(ii) mixtures with at least one compound of formula (I) wherein X is Cl and at least one compound of formula (I) wherein X is F are excluded from the scope of the protection.

More preferred compounds according to formula (I) have the following formula (Ia')

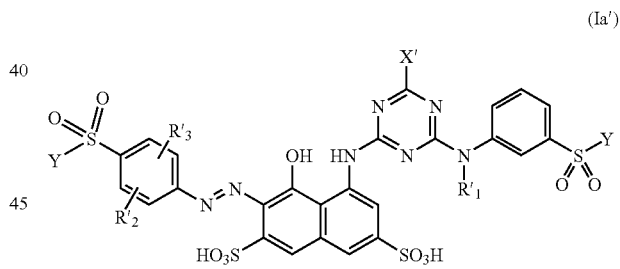

(Ia')

wherein
X' is Cl or F,
$R'_1$ is a $C_{1-2}$-alkyl, especially —C$_2$H$_5$, or a $C_{2-4}$-alkyl group, which is monosubstituted by Cl, F, Br, —OH, —CN or —NH$_2$,
$R'_2$ and $R'_3$ are independently from each other H; $C_{1-2}$-alkyl; —SO$_3$H or —OC$_{1-2}$alkyl, especially H; —CH$_3$; —SO$_3$H or —OCH$_3$
Y signifies —CH=CH$_2$ or —CH$_2$CH$_2$-Z, wherein Z is a —OSO$_3$H goup,
or a salt thereof and/or mixtures thereof, with the proviso that
(ii) mixtures with at least one compound of formula (I) wherein X is Cl and at least one compound of formula (I) wherein X is F are excluded from the scope of the protection.

When a fiber-reactive dyestuff of formula (I) is in its salt-form, the cation associated with the sulpho-groups is not critical and may be any of those non-chromophoric cations conventional in the field of fiber-reactive dyestuffs provided that the corresponding salt is substantially water-soluble. Examples of such cations are alkali metal cations, for example potassium, lithium or sodium ions and ammonium cations, e.g. mono-, di-, tri- and tetra-methyl or mono-, di-, tri- and tetra-ethyl ammonium cations. The cations may be the same or different, i.e. the compounds may be in mixed salt-form.

In another aspect of the invention there is provided a mixture comprising a compound of formula (Ib)

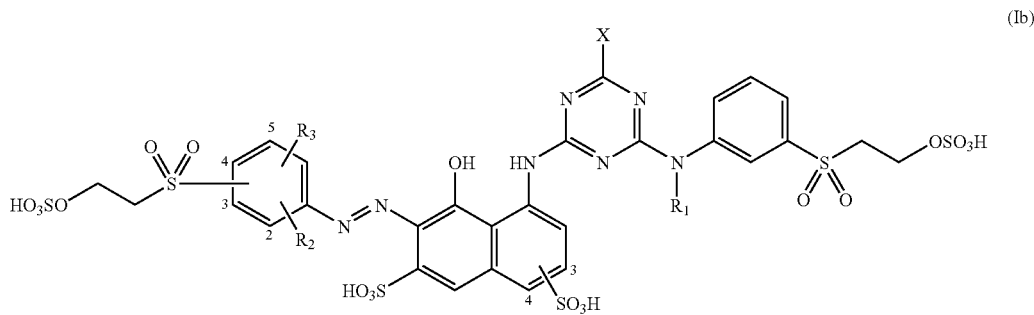

(Ib)

and a compound of formula (Ic)

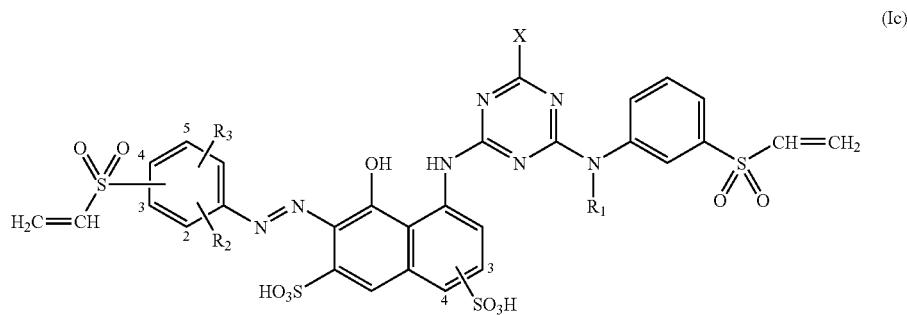

(Ic)

and a mixture of a compound of formula (Id) and a compound of formula (Ie)

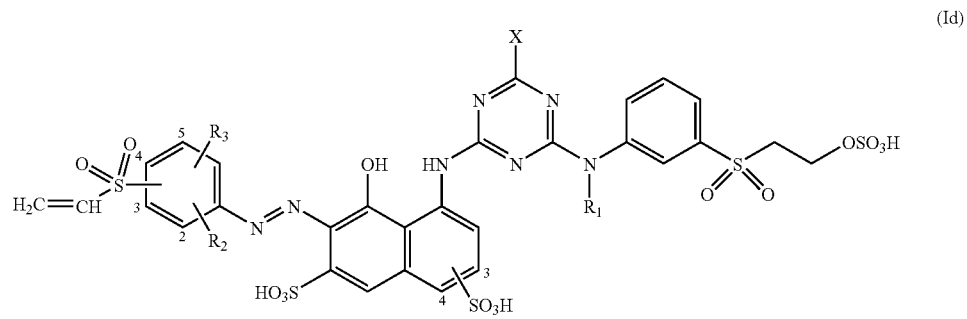

(Id)

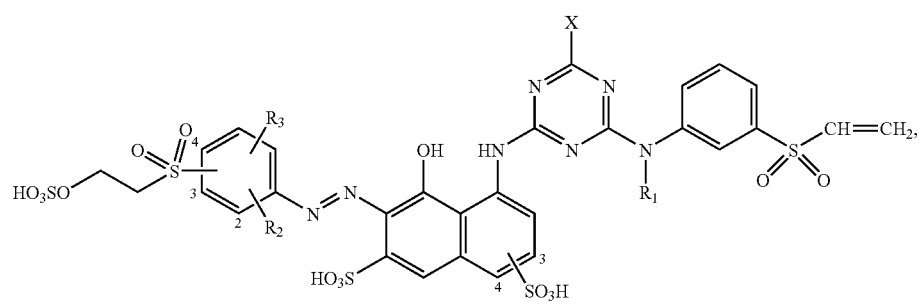

(Ie)

wherein all substituents have the meanings as defined above. Due to the process of forming such a mixture, each substituent has the same meaning in formula (Ib), (Ic) (Id) and (Ie) and every group is fixed at the same position in formula (Ib), (Ic), (Id) and (Ie).

A preferred mixture comprises about
5–45 weight-% of a compound of formula (Ib) and
40–55 weight-% of a mixture of a compound of formula (Id) and (Ie)
5–50 weight-% of a compound of formula (Ic).

The total of a mixture is 100%. The weight percents (wt-%) refer to the total amount of the 3 components.

A fiber-reactive dyestuff of formula (I) or a mixture thereof or a mixture of compounds of formula (Ib), (Ic), (Id) and (Ie) display good compatibility with other known dyestuffs. Accordingly, it may be mixed with other dyestuffs to form a composition, which can be used to dye or print suitable substrates. Said other dyestuffs must be compatible with a compound of formula (I) or its mixtures, that is, they must have similar dyeing or printing properties, for example fastness properties.

Accordingly, the invention provides in another of its aspects a dyeing or printing composition comprising a fiber-reactive dyestuff of the formula (I) or a mixture of compounds of formula (Ib), (Ic), (Id) and (Ie).

In another aspect of the invention there is provided a process of forming a fiber-reactive dyestuff of formula (I) or a salt thereof comprising the step of reacting a diazotized compound of the formula (II)

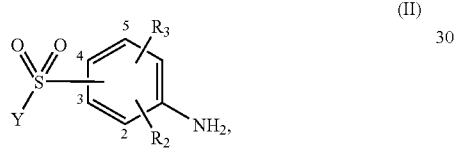

(II)

wherein all substituents have the meanings as defined above, with a compound of the formula (III)

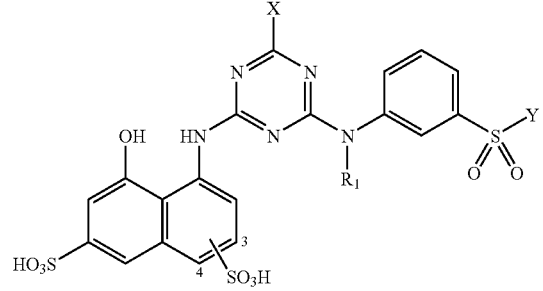

(III)

wherein all substituents have the meanings as defined above.

The process is preferably carried out in an aqueous medium at a temperature of from 0 to 40° C., more preferably 0 to 25° C. and at a pH of between 1 to 7, more preferably 1 to 6.

A fiber-reactive dyestuff of formula (I) may be isolated in accordance with known methods, for example by salting out, filtering and drying optionally in vacuum and at slightly elevated temperature.

Depending on the reaction and/or isolation conditions, a fiber-reactive dyestuff of the formula (I) may be obtained in free-acid or salt-form or mixed salt-form, containing for example one or more of the above-mentioned cations. A fiber-reactive dyestuff of formula (I) may be converted from salt-form or mixed salt-form to free-acid form or vice versa using conventional techniques.

The compounds of formula (III) are obtainable by a condensation reaction of

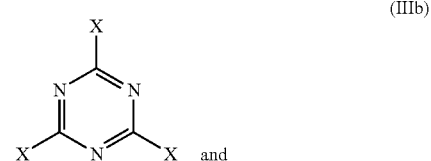

(IIIb)

and

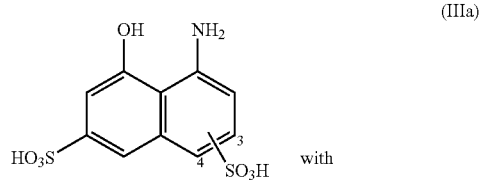

(IIIa)

with

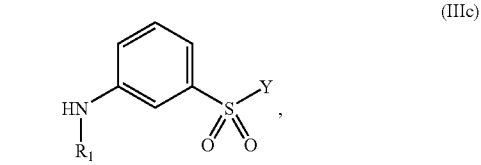

(IIIc)

wherein all substituents have the meanings as defined above.

The compounds (II) are derivable by well-known syntheses from commonplace starting materials well known to persons skilled in the art.

In another aspect of the invention there is provided a process of forming mixtures of compounds of formula (Ib), (Ic), (Id) and (Ie) as described above, characterized in that a compound of formula (Ib)

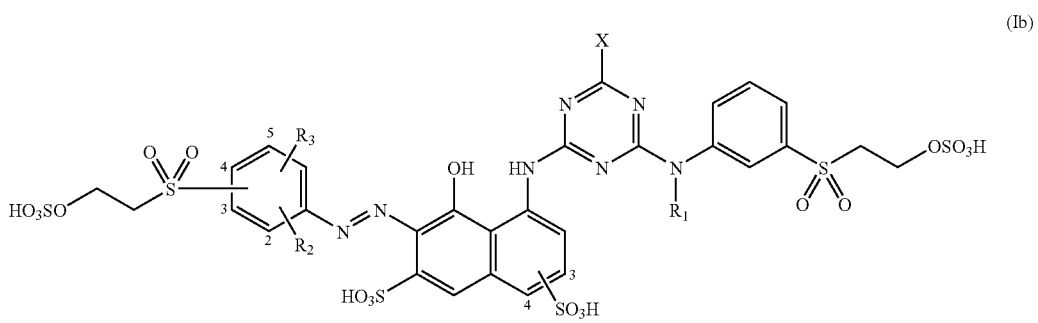

(Ib)

wherein all substituents are defined above is reacted with NaOH.

The process is preferably carried out in an aqueous medium at a temperature of from 10 to 40° C. and at a pH of between 6 to 11.

By the variation of the mol-ratio of the NaOH in relation to the starting compound (formula (Ib)) the ratio of these components in the mixture can be varied.

A fiber-reactive dyestuff of the formula (I) or a mixture thereof or a mixture of compounds of formula (Ib), (Ic), (Id) and (Ie) are useful as a fiber-reactive dyestuff for dyeing or printing hydroxy-group-containing or nitrogen-containing organic substrates. Preferred substrates are leather and fibrous materials, which comprise natural or synthetic polyamides and, particularly, natural or regenerated cellulose such as, cotton, viscose and spun rayon. The most preferred substrates are textile materials comprising cotton.

Accordingly, in another aspect of the invention there is provided the use of a fiber-reactive dyestuff according to the formula (I) or a salt thereof or a mixture thereof or a mixture of compounds of formula (Ib), (Ic), (Id) and (Ie) as a fiber-reactive dyestuff for dyeing or printing hydroxy-group-containing or nitrogen-containing organic substrates.

Dyeing or printing may be carried out in accordance with known methods conventional in the fiber-reactive dyestuff field.

In a preferred dyeing process the exhaust-dyeing method is used at temperatures within the range of from 40 to 100° C., more preferably 50 to 80° C. A fiber-reactive dyestuff of formula (I) or a mixture thereof or a mixture of compounds of formula (Ib), (Ic), (Id) and (Ie) give good exhaust and fixation yields. Moreover, any unfixed dyestuff is easily washed from the substrate.

In a preferred printing process, the padding method is used, for example pad-steam, pad-thermofix, pad-dry, pad-batch, pad-jig and pad-roll.

Alternatively, printing may be carried out using ink-jet methods. The preparation of ink-jet inks comprises the use of a dyestuff or a mixture of dyestuffs according to the formula (I) or a salt thereof or a mixture thereof or a mixture of compounds of formula (Ib), (Ic), (Id) and (Ie). A dyeing or print obtained with said fiber-reactive dyestuff exhibits good fastnesses.

The dyes and the mixtures of the dyes are taken up by the fibers very quickly which leads to rapid process cycles in, for example, the continuous dyeing processes. The built up properties are good as well.

Dyeings and prints obtained using mixtures of dyestuffs display good fastness properties which are comparable with those fastness properties obtained with a compound of formula (I) alone.

The following examples illustrate the invention. In the examples all parts and percentages are by weight unless indicated to the contrary, and all temperatures are given in degrees Centigrade.

EXAMPLE 1

63.8 parts of 1-amino-8-hydroxynaphthalene-4,6-disulfonic acid are dissolved in 600 parts of water at 10° C. to 15° C. The pH is adjusted with sodium hydroxide solution at 6 to 7. This solution is added in portion to a suspension that was prepared out of 200 parts of a water/ice mixture and 37 parts of 2,4,6-trichlorotriazine in the presence of a surface-active agent. After the condensation is finished, 70 parts of 3-ethylamino-phenyl- (2'sulfatoethyl)sulfone are added and the pH is increased to 3.5–4 by addition of 15% sodium carbonate solution during 3–4 hours. The coupling component of the following formula (IIId)

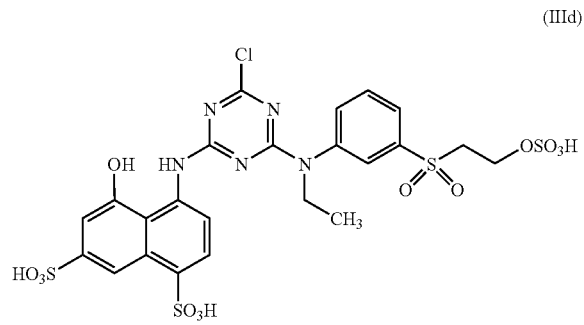

is obtained. 58 parts of 4-aminophenyl-(2'sulfatoethyl)sulfone in a solution of 120 parts of water, 120 parts of ice and 40 parts of a 30% HCl solution are diazotized by 52 parts of a 4 n sodium nitrite solution. This reaction solution is added to the coupling component of formula (IIId). The pH value is adjusted at 5–5.5 by addition of a 15% sodium carbonate solution and the temperature is maintained at 15–20° C. After clarification the obtained compound of formula (IV)

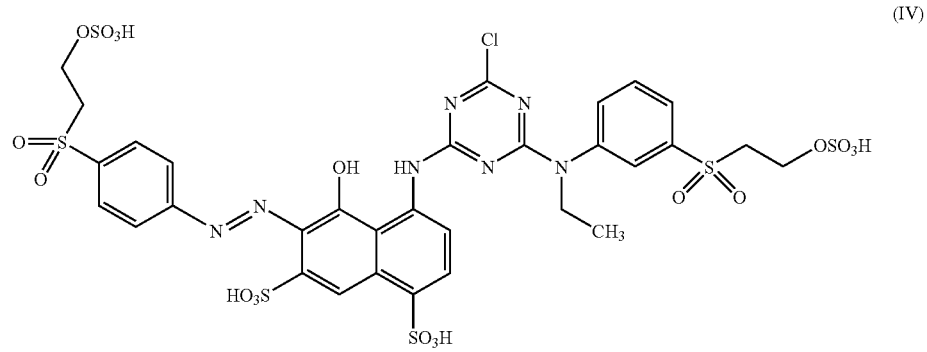

is salted out, filtered off and dried under vacuum at 50° C. or dried by spray drying. The obtained compound dyes cellulose fibers in red shades. The resultant dyeings exhibited excellent light and wet fastness properties whereby the unfixed dyestuff can easily be washed out, even from deep dyeings. The dyestuff has an excellent behavior of migration in the salt phase.

The following examples 2–18 are made according the methods described in example 1.

TABLE 1

Examples 2–17

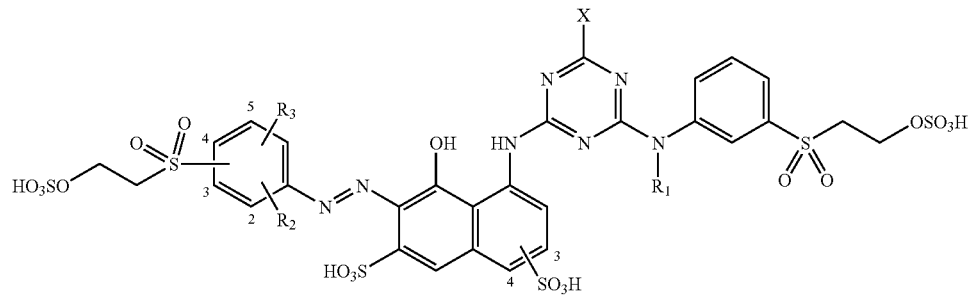

(Ib)

| Ex. | Position of —O₂S— | Position of —SO₃H | R₁ | R₂ | R₃ | X |
|---|---|---|---|---|---|---|
| 2 | 4 | 3 | —CH₂CH₃ | H | H | F |
| 3 | 4 | 3 | —CH₂CH₃ | H | H | Cl |
| 4 | 4 | 4 | —CH₂CH₃ | H | H | F |
| 5 | 4 | 3 | —CH₃ | H | H | F |
| 6 | 4 | 3 | —CH₂CH₃ | (2)-OCH₃ | H | Cl |
| 7 | 4 | 3 | —CH₂CH₃ | (2)-OCH₃ | (5)-CH₃ | Cl |
| 8 | 4 | 3 | —CH₃ | (2)-OCH₃ | (5)-OCH₃ | F |
| 9 | 4 | 4 | —CH₂CH₃ | (2)-OCH₃ | (5)-OCH₃ | Cl |
| 10 | 4 | 4 | —CH₂CH₃ | (2)-SO₃H | H | Cl |
| 11 | 5 | 3 | —CH₃ | (2)-SO₃H | H | F |
| 12 | 5 | 3 | —CH₂CH₃ | (2)-SO₃H | H | Cl |
| 13 | 4 | 3 | —CH₂CH₃ | (2)-SO₃H | H | Cl |
| 14 | 4 | 3 | —CH₂CH₃ | (2)-SO₃H | H | F |
| 15 | 3 | 3 | —CH₂CH₃ | (4)-OCH₃ | H | Cl |

The following examples 16–31 are made according to the method described in example 1. But the obtained compounds according to formula (Ib) are reacted to compounds according to formula (Ic) by adding 2 mol of NaOH.

TABLE 2

Examples 16–30

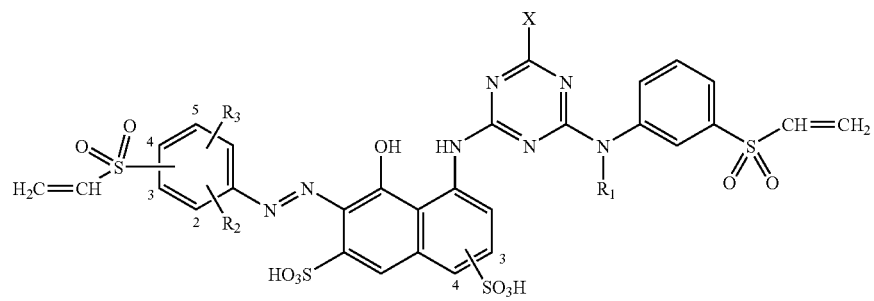

(Ic)

| Ex. | Position of —O₂S— | Position of —SO₃H | R₁ | R₂ | R₃ | X |
|---|---|---|---|---|---|---|
| 16 | 4 | 3 | —CH₂CH₃ | H | H | F |
| 17 | 4 | 3 | —CH₂CH₃ | H | H | Cl |
| 18 | 4 | 4 | —CH₂CH₃ | H | H | Cl |
| 19 | 4 | 4 | —CH₂CH₃ | H | H | F |
| 20 | 4 | 3 | —CH₃ | H | H | F |
| 21 | 5 | 3 | —CH₂CH₃ | (2)-OCH₃ | H | Cl |

TABLE 2-continued

Examples 16–30

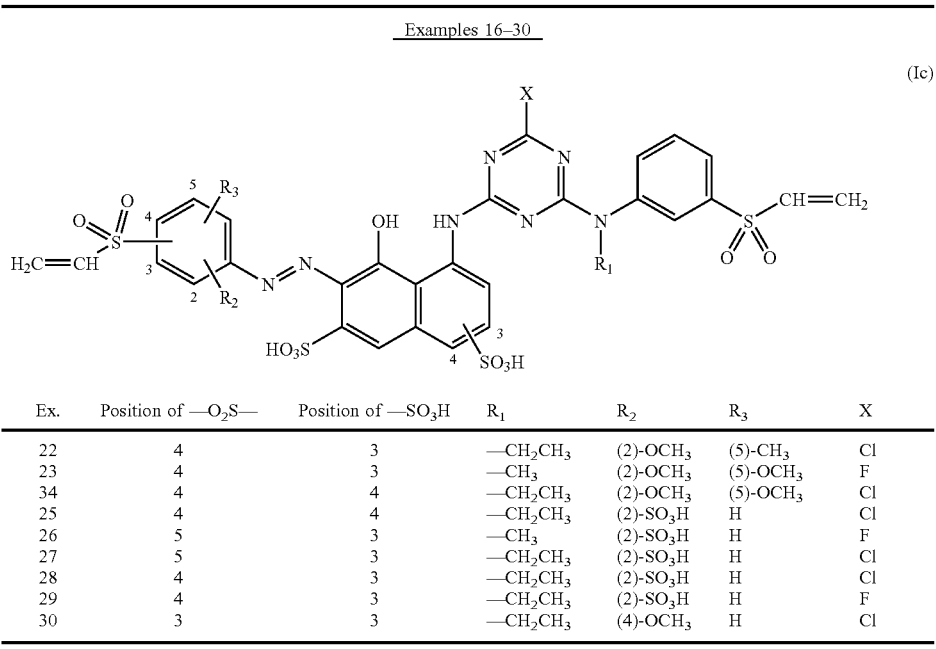

(Ic)

| Ex. | Position of —O$_2$S— | Position of —SO$_3$H | R$_1$ | R$_2$ | R$_3$ | X |
|---|---|---|---|---|---|---|
| 22 | 4 | 3 | —CH$_2$CH$_3$ | (2)-OCH$_3$ | (5)-CH$_3$ | Cl |
| 23 | 4 | 3 | —CH$_3$ | (2)-OCH$_3$ | (5)-OCH$_3$ | F |
| 34 | 4 | 4 | —CH$_2$CH$_3$ | (2)-OCH$_3$ | (5)-OCH$_3$ | Cl |
| 25 | 4 | 4 | —CH$_2$CH$_3$ | (2)-SO$_3$H | H | Cl |
| 26 | 5 | 3 | —CH$_3$ | (2)-SO$_3$H | H | F |
| 27 | 5 | 3 | —CH$_2$CH$_3$ | (2)-SO$_3$H | H | Cl |
| 28 | 4 | 3 | —CH$_2$CH$_3$ | (2)-SO$_3$H | H | Cl |
| 29 | 4 | 3 | —CH$_2$CH$_3$ | (2)-SO$_3$H | H | F |
| 30 | 3 | 3 | —CH$_2$CH$_3$ | (4)-OCH$_3$ | H | Cl |

EXAMPLE 31

The procedure according to Example 1 is repeated. But instead of salting out the compound having formula (IV)

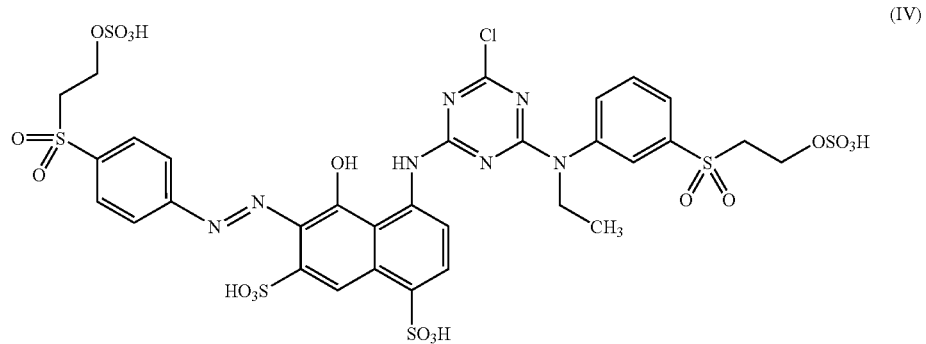

(IV)

1 mol NaOH is added at a temperature of 25° C. and at a pH of 7–8. The reaction mixture is stirred for 5 h. The obtained formulation contains about 25 wt % of a compound of formula (IV), about 50% of a mixture of formula (V) and (VI)

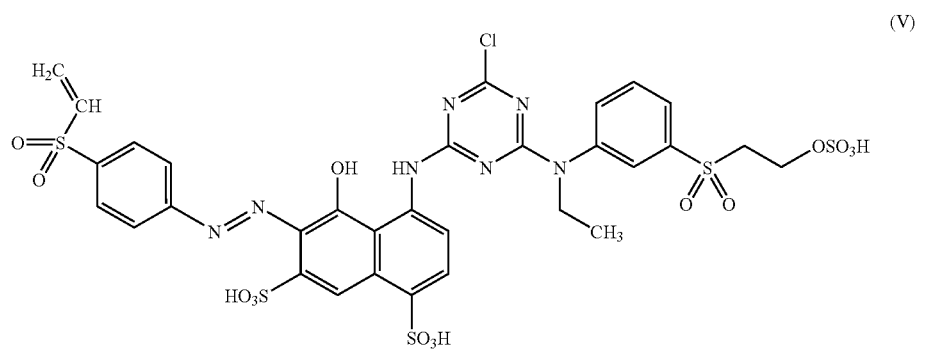

(V)

-continued (VI)

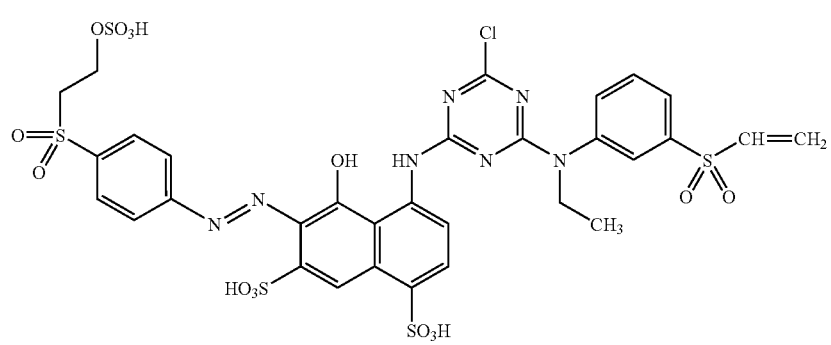

and about 25% of a compound of formula (VII)

(VII)

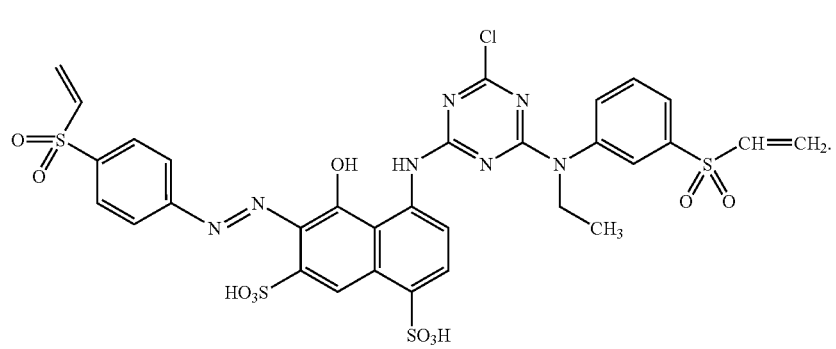

The obtained formulation dyes cellulose fibers in red shades. The resultant dyeings exhibited excellent light and wet fastness properties whereby the unfixed dyestuff can easily be washed out, even from deep dyeings. The dyestuff mixture has an excellent behavior of migration in the salt phase. The ration of these components can be varied by the mol-amount of NaOH that is added.

The following examples 32–45 are made according to the method described in example 31. The obtained dyestuff mixture contains the same ratio of each component (Ib), (Ic), (Id) and (Ie).

TABLE 3

Examples 32–45

(Ib)

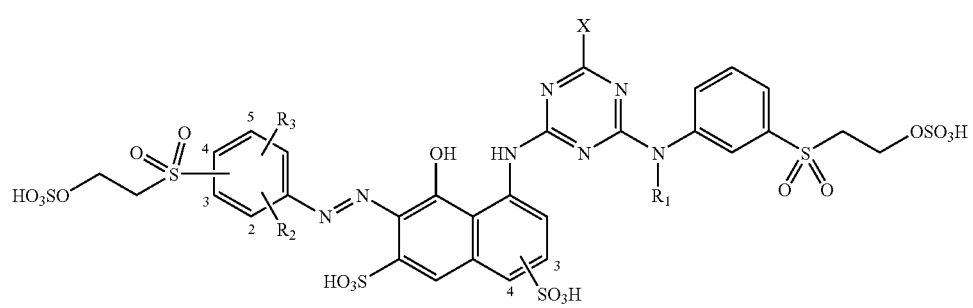

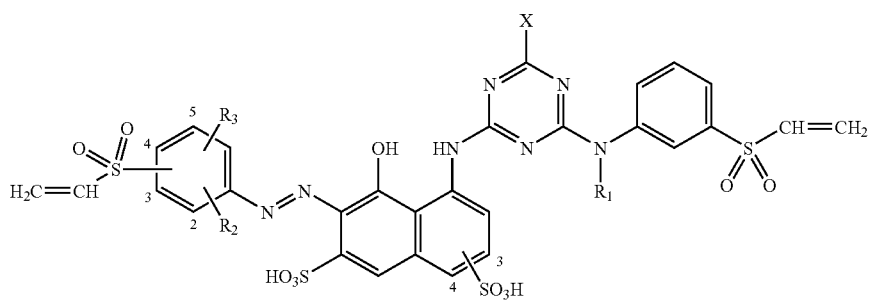

(Ic)

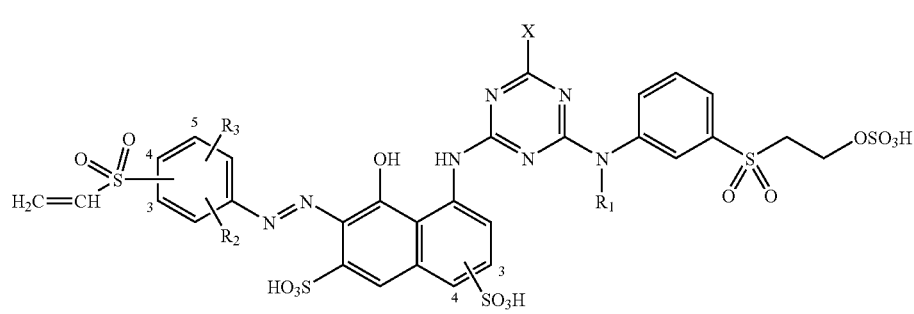

(Id)

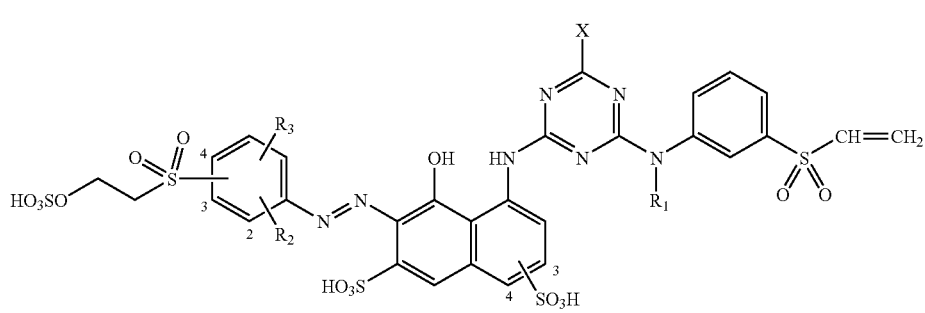

(Ie)

| Ex. | Position of —O₂S— | Position of —SO₃H | R₁ | R₂ | R₃ | X |
|-----|-------------------|-------------------|-----|-----|-----|---|
| 32 | 4 | 3 | —CH₂CH₃ | H | H | F |
| 33 | 4 | 3 | —CH₂CH₃ | H | H | Cl |
| 34 | 4 | 4 | —CH₂CH₃ | H | H | F |
| 35 | 4 | 3 | —CH₃ | H | H | F |
| 36 | 5 | 3 | —CH₂CH₃ | (2)-OCH₃ | H | Cl |
| 37 | 4 | 3 | —CH₂CH₃ | (2)-OCH₃ | (5)-CH₃ | Cl |
| 38 | 4 | 3 | —CH₃ | (2)-OCH₃ | (5)-OCH₃ | F |
| 39 | 4 | 4 | —CH₂CH₃ | (2)-OCH₃ | (5)-OCH₃ | Cl |
| 40 | 4 | 4 | —CH₂CH₃ | (2)-SO₃H | H | Cl |
| 41 | 5 | 3 | —CH₃ | (2)-SO₃H | H | F |
| 42 | 5 | 3 | —CH₂CH₃ | (2)-SO₃H | H | Cl |
| 43 | 4 | 3 | —CH₂CH₃ | (2)-SO₃H | H | Cl |
| 44 | 4 | 3 | —CH₂CH₃ | (2)-SO₃H | H | F |
| 45 | 3 | 3 | —CH₂CH₃ | (4)-OCH₃ | H | Cl |

Application Example A 0.3 Part of the dyestuff of Example 1 is dissolved in 150 parts of demineralized water and 12 parts NaCl. The dyebath is heated to 60° C., then 10 parts of cotton fabric (bleached) are added. After 30 minutes at 60° C., 3 part of sodium carbonate (calcined) are added to the bath. The addition is done in portion of 0.1, 0.3, 0.6 and 2 parts each 10 min. During the addition of sodium carbonate the temperature is kept at 60° C. Subsequently, the dyebath is heated to 60° C., and dyeing is effected for a further one hour at 60° C. The dyed fabric is then rinsed with running cold water for 3 minutes and afterwards with running hot water for a further 3 minutes. The dyeing is washed at the boil for 15 minutes in 500 parts of demineralized water in the presence of 0.25 part of Marseille soaps. After being rinsed with running hot water (for 3 minutes) and centrifuged, the dyeing is dried in a cabinet drier at about 70° C. A red cotton dyeing with excellent light and wet fastness properties is obtained.

Similarly, the dyestuffs as well as the mixtures of Table 1, 2 and 3 are employed to dye cotton in accordance with the method described in Application Example A.

Application Example B

To a dyebath containing in 100 parts of demineralized water and 8 parts Glauber's salt (calcined) 10 parts of cotton fabric (bleached) are added. The bath is heated to 50° C. within 10 minutes, and 0.5 part of the dyestuff mixture of Example 36 is added. After a further 30 minutes at 50° C., 1 part of sodium carbonate (calcined) is added. The dye-bath is then heated to 60° C. and dyeing is continued at 60° C. for a further 45 minutes. The dyed fabric is rinsed with running cold and then hot water and washed at the boil according to the method of application Example A. After rinsing and drying a red cotton dyeing is obtained.

Similarly, the dyestuffs as well as the mixtures of Table 1, 2 and 3 are employed to dye cotton in accordance with the method described in Application Example B.

Application Example C 20 parts of the dye of Preparation Example 36 are dissolved in 1000 parts of demineralized water, and then 75 parts of 27 weight-% sodium silicate and 24 parts of 30 weight-% sodium hydroxide solution are added. This dye solution is applied to 100 parts of bleached cotton cretonne at 25° C. by pad-mangling to 65% wet pick-up, and the fabric is then batched at room temperature for 5 hours. The dyed fabric is rinsed first with running cold water and then with hot water and then washed as in Application Example A. Rinsing and drying leaves a red cotton dyeing having very good light and wet fastnesses.

Application Example D

A printing paste consisting of

| | |
|---|---|
| 40 | parts of the dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods. The printed fabric is dried and fixed in steam at 102–104° C. for 4–8 minutes. It is rinsed in cold and then hot water, washed at the boil (according to the method described in Application Example A) and dried. A red print is obtained which has good general fastness properties.

Similarly, the dyestuffs as well as the mixtures of Table 1, 2 and 3 are employed to print cotton in accordance with the method given in Application Example C.

Application Example E 2.5 parts of the dyestuff obtained in Example 1 are dissolved with stirring at 25° C. in a mixture of 20 parts diethyleneglycol and 77.5 parts water to obtain a printing ink suitable for ink jet printing.

Similarly, the dyestuffs as well as the mixtures of Table 1, 2 and 3 can also be used in a manner analogous to that described in Application Examples D.

The invention claimed is:

1. A compound according to formula (I)

$$\text{(I)}$$

wherein
  $R_1$ is a $C_{1-4}$-alkyl group or a substituted $C_{2-4}$-alkyl group,
  $R_2$ and $R_3$ are independently from each other; —OH; —CN: $C_{1-2}$-alkyl; —SO$_3$H; COOH; —OC$_{1-2}$-alkyl or —NH$_2$,
  X is a halogen radical and
  Y signifies —CH=CH$_2$ or —CH$_2$CH$_2$-Z, wherein Z is a radical which can be eliminated by alkali,
or a salt thereof and/or mixtures thereof, with the proviso that
  (i) mixtures with at least one compound of formula(I) wherein X is Cl and at least one compound of formula (I) wherein X is F are excluded from the scope of the protection.

2. A compound of formula (I) according to claim 1 wherein $R_1$ is a $C_{1-2}$-alkyl group or a $C_{2-4}$-alkyl group, which is monosubstituted by Cl, F, Br, —OH, —CN or —NH$_2$ and X is Cl or F.

3. A compound of formula (I) according to claim 2 wherein $R_1$ is a —C$_2$H$_5$ radical.

4. A compound of formula (I) according to claim 1 wherein $R_2$ and $R_3$ are independently from each other $C_{1-2}$-alkyl; —SO$_3$H or —OC$_{1-2}$-alkyl.

5. A compound of formula (I) according to claim 1 having the formula (Ia')

$$\text{(Ia')}$$

wherein
  X' is Cl or F,
  $R'_1$ is a $C_{1-2}$-alkyl, especially —C$_2$H$_5$, or a $C_{2-4}$-alkyl group, which is monosubstituted by Cl, F, Br, —OH, —CN or —NH$_2$,
  $R'_2$ and $R'_3$ are independently from each other; $C_{1-2}$-alkyl; —SO$_3$H or —OC$_{1-2}$ alkyl, especially H; —CH$_3$; —SO$_3$H or —OCH$_3$
  Y signifies —CH=CH$_2$ or —CH$_2$CH$_2$-Z, wherein Z is a -OSO$_3$H group,
or a salt thereof and/or mixtures thereof, with the proviso that (i) mixtures with at least one compound of formula (I) wherein X is Cl and at least one compound of formula (I) wherein X is F are excluded from the scope of the protection.
6. A mixture comprising a compound of formula (Ib)
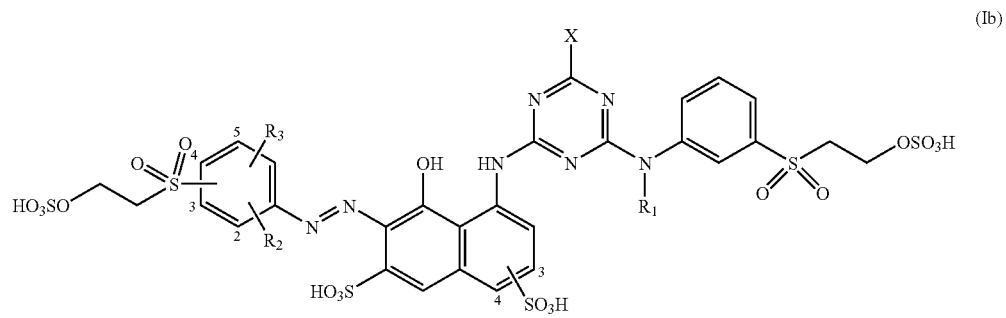
and a compound of formula (Ic)
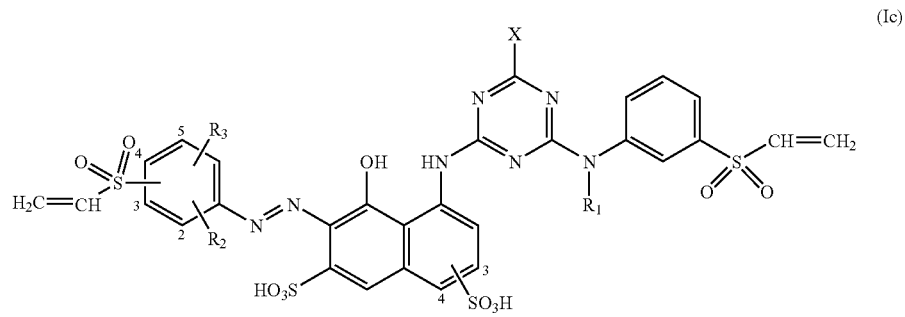
and a mixture of a compound of formula (Id) and a compound of formula (Ie)
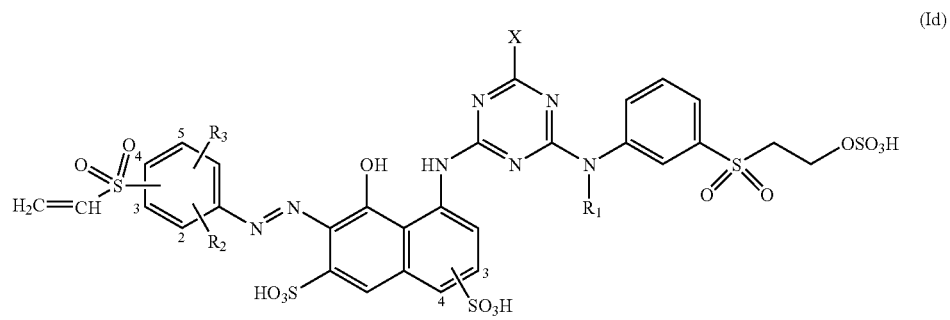

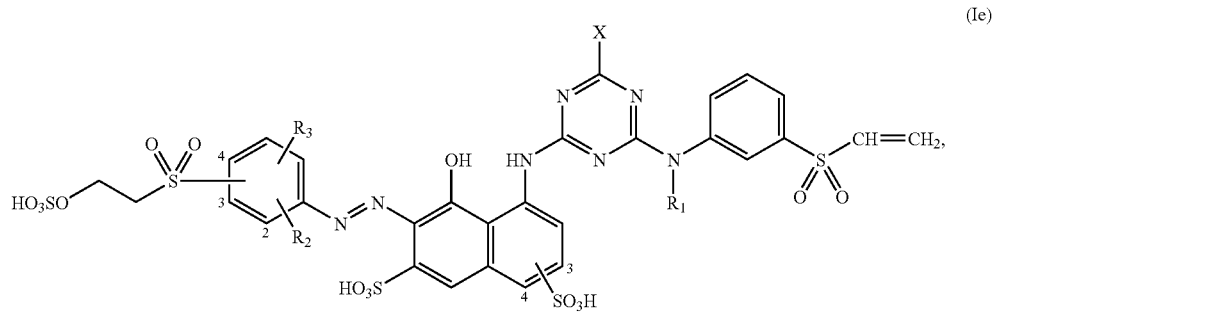
(Ie)

wherein
$R_1$ is a $C_{1-4}$-alkyl group or a substituted $C_{2-4}$-alkyl group,
$R_2$ and $R_3$ are independently from each other H; —OH; —CN; $C_{1-2}$-alkyl; —SO$_3$H; —COOH; —OC$_{1-2}$-alkyl or —NH$_2$,
X is a halogen radical and
Y signifies —CH=CH$_2$, or —CH$_2$CH$_2$-Z, wherein Z is a radical which can be eliminated by alkali,
or a salt thereof and/or mixtures thereof, with the provisos that
(i) the compounds of the following formula

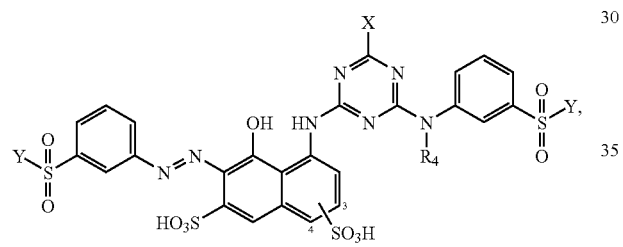

wherein X and Y have the same meanings as defined above and $R_4$ signifies methyl or ethyl,
are excluded from the scope of the protection and
(ii) mixtures with at least one compound of formula (I) wherein X is Cl and at least one compound of formula (I) wherein X is F are excluded from the scope of the protection as well.

7. A process of forming a fiber-reactive dyestuff of formula (I) as defined in claim 1 or a salt thereof comprising the step of reacting a diazotized compound of the formula (II)

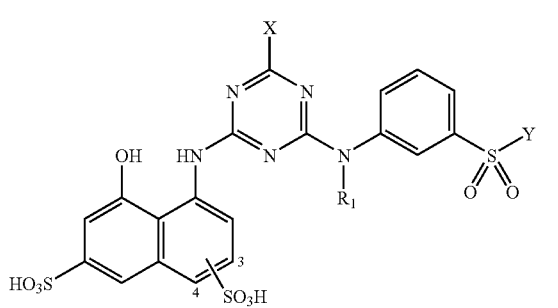
(II)

wherein Y, $R_2$ and $R_3$ have the meanings as defined claim 1, with a compound of the formula (III)

(III)

wherein X, Y and $R_1$ have the meanings as defined in claim 1.

8. A process of forming a mixture as defined in claim 6 where a compound of formula (Ib)

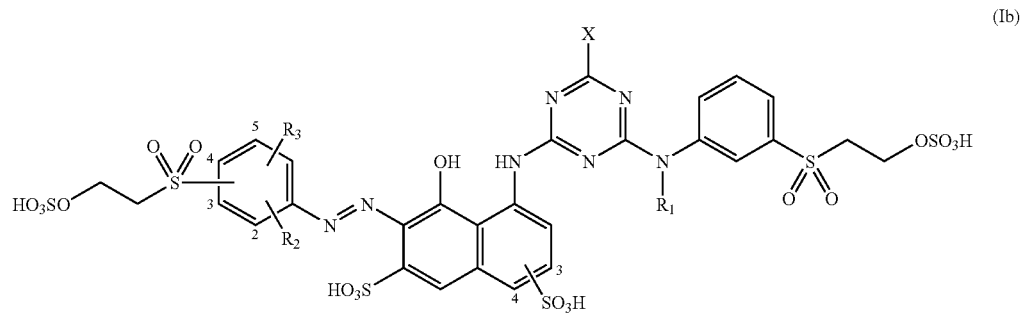
(Ib)

wherein all substituents are defined as in claim 6, is reacted with NaOH.

9. A method for dyeing or printing hydroxy-group-containing or nitrogen-containing organic substrates comprising the steps of:
  providing a substrate which contains a hydrogen group or a nitrogen group;
  providing a fiber-reactive dyestuff of formula (I) or a mixture thereof as defined in claim 1; and
  contacting said substrate with said fiber-reactive dyestuff.

10. An ink-jet ink comprising a dyestuff according to claim 1.

11. A hydroxy-group-containing or nitrogen-containing organic substrate dyed or printed with a fiber-reactive dyestuff of formula (I) according to claim 1.

12. A method for ink jet printing hydroxy-group-containing or nitrogen-containing organic substrates comprising the steps of:
  providing a substrate which contains a hydrogen group or a nitrogen group;
  providing a fiber-reactive dyestuff of formula (I)

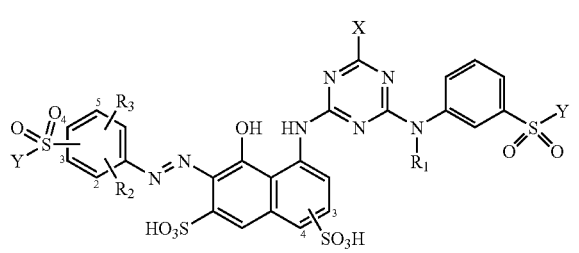

(I)

wherein
  $R_1$ is a $C_{1-4}$-alkyl group or a substituted $C_{2-4}$-alkyl group,
  $R_2$ and $R_3$ are independently from each other H: —OH; —CN; $C_{1-2}$-alkyl; —$SO_3H$; —COOH; —$OC_{1-2}$-alkyl or —$NH_2$,
  X is a halogen radical and
  Y signifies —CH=$CH_2$ or —$CH_2CH_2$-Z, wherein Z is a radical which can be eliminated by alkali,
  or a salt thereof and/or mixtures thereof, with the provisos that (i) the compounds of the following formula

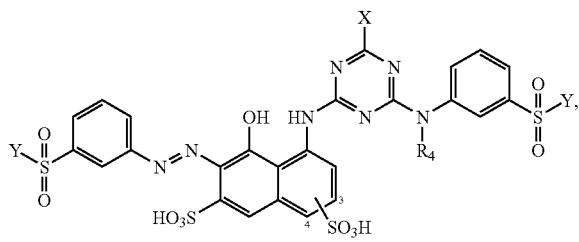

wherein X and Y have the same meanings as defined above and $R_4$ signifies methyl or ethyl,
  are excluded from the scope of the protection and
(ii) mixtures with at least one compound of formula (I) wherein X is Cl and at least one compound of formula (I) wherein X is F are excluded from the scope of the protection as well
or a mixture thereof and
  ink jet printing said substrate with said fiber-reactive dyestuff.

13. A method for dyeing or printing hydroxy-group-containing or nitrogen-containing organic substrates comprising the steps of:
  providing a substrate which contains a hydrogen group or a nitrogen group;
  providing a fiber-reactive dyestuff of formula (I) or a mixture according to claim 6; and
  contacting said substrate with said fiber-reactive dyestuff.

14. A hydroxy-group-containing or nitrogen-containing organic substrate dyed or printed with a fiber-reactive dyestuff mixture according to claim 6.

15. A method for ink jet printing hydroxy-group-containing or nitrogen-containing organic substrates comprising the steps of:
  providing a substrate which contains a hydrogen group or a nitrogen group;
  providing a fiber-reactive dyestuff mixture according to claim 6 and
  ink jet printing said substrate with said fiber-reactive dyestuff mixture.

16. An ink-jet ink comprising a mixture of dyestuffs according to claim 6.

* * * * *